United States Patent [19]

Kimura et al.

[11] Patent Number: 4,577,845
[45] Date of Patent: Mar. 25, 1986

[54] HYDROSTATIC PRESSURE XY TABLE

[75] Inventors: Sosaku Kimura; Toshikazu Hatsuse, both of Saitama, Japan

[73] Assignee: Citizen Watch Co., Ltd., Tokyo, Japan

[21] Appl. No.: 569,217

[22] Filed: Jan. 9, 1984

[30] Foreign Application Priority Data

Jan. 18, 1983 [JP] Japan .................................. 58-5279
Mar. 8, 1983 [JP] Japan .................................. 58-36667

[51] Int. Cl.⁴ .............................................. B23Q 1/18
[52] U.S. Cl. .................................. 269/73; 74/424.8 R; 74/441; 108/137
[58] Field of Search .................... 269/73, 71; 108/137, 108/143; 74/441, 424.8 R, 89.15; 33/1 M; 250/442.1, 492.2; 408/91; 378/208

[56] References Cited

U.S. PATENT DOCUMENTS

| | | | |
|---|---|---|---|
| 2,957,362 | 10/1960 | Kelm .................... | 269/73 X |
| 3,183,732 | 5/1965 | Porath .................... | 74/424.8 R |
| 3,595,100 | 7/1971 | Stark et al. .................... | 74/424.8 R |
| 3,638,933 | 2/1972 | Burnette et al. .................... | 108/137 X |
| 3,858,601 | 1/1975 | Ensinger .................... | 137/615 X |
| 4,129,291 | 12/1978 | Kato et al. .................... | 269/73 |
| 4,462,580 | 7/1984 | Nielsen .................... | 269/73 |

FOREIGN PATENT DOCUMENTS

| | | | |
|---|---|---|---|
| 2112676 | 9/1971 | Fed. Rep. of Germany ..... | 74/424.8 R |
| 2731706 | 1/1978 | Fed. Rep. of Germany ........ | 269/73 |
| 25979 | 3/1978 | Japan .................................. | 269/73 |

Primary Examiner—Frederick R. Schmidt
Assistant Examiner—Steven P. Schad
Attorney, Agent, or Firm—Koda and Androlia

[57] ABSTRACT

A hydrostatic pressure XY table comprising first and second sliding tables mounted on a bed. The two sliding tables are driven perpendicularly to each other by separate motors through a first lead screw supported on the bed and a second lead screw supported on the first sliding table. The bed has a first trapezoidal groove and the first sliding table has a second trapezoidal groove running perpendicular to the first trapezoidal groove. The first sliding table is engaged with the first trapezoidal groove and the second sliding table is engaged with the second trapezoidal groove. Four hydrostatic pressure guides are provided in the bed, to engage with engaging surfaces of the first sliding table. Four hydrostatic pressure guides are also provided in the first sliding table to engage with engaging surfaces of the second sliding table. A plurality of fluid pressure lines are provided for supplying hydrostatic pressure to the engaging surfaces of the first and second sliding tables. A hydrostatic pressure feed mechanism consisting of a lead screw, a nut and a fluid pressure line for supplying hydrostatic pressure through the nut to opposite screw faces of the lead screw is provided for each sliding table. By use of the hydrostatic pressure XY table it is possible to carry out machining operations in which close dimensional tolerances must be observed as in the grinding of magnetic disk heads and the grinding and polishing of plastic shaping dies.

5 Claims, 7 Drawing Figures

HYDROSTATIC PRESSURE XY TABLE

BACKGROUND OF THE INVENTION

1. Field of the Invention

This invention relates to a hydrostatic pressure XY table suitable for use in ultra-high precision machining, more particularly to a hydrostatic pressure XY table optimally suited for use, for example, in grinding the track surface of a magnetic head for a magnetic disk unit and the beveled surface contiguous with this track surface or in grinding a shaping die for plastic lenses.

2. Description of the Prior art

Figure 1:
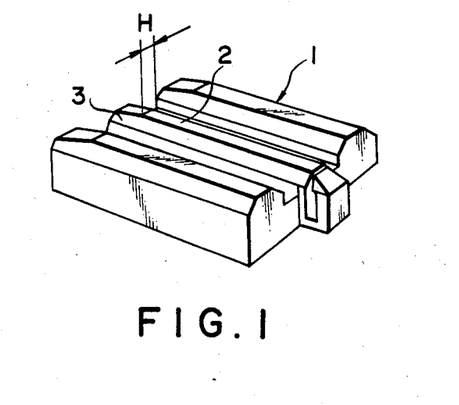
FIG. 1 is a perspective view of a magnetic head for a magnetic disk unit shown as one example of a workpiece to be machined by a machine employing the hydrostatic pressure XY table according to the present invention.
Figure 2:
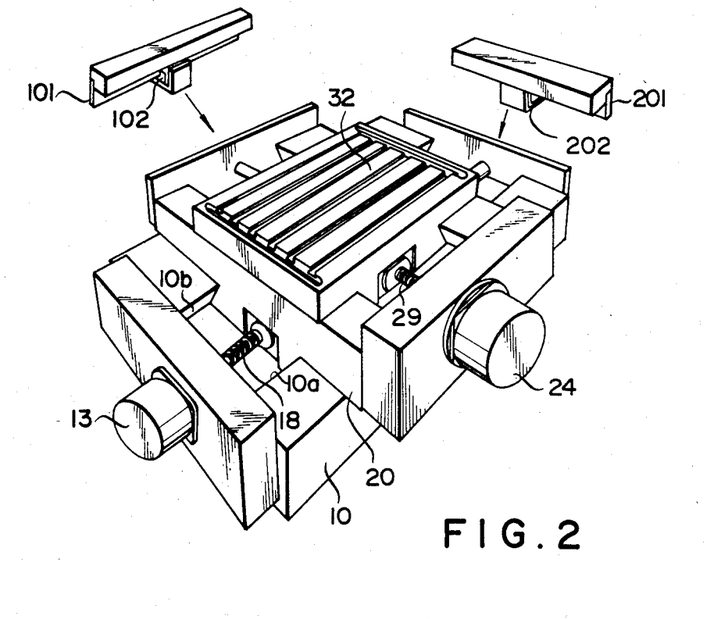
FIG. 2 is a perspective view showing the overall structure of a hydrostatic pressure XY table according to one embodiment of the present invention.

FIG. 1 of the attached drawings shows the configuration of a ferrite core 1 of a magnetic head. In the fabrication of a magnetic head employing such a ferrite core there is required a level of grinding precision and quality considerably higher than in general applications. This can be attriubuted to the following factors:

(1) The track width H determined by the two beveled surfaces contiguous with the track surface 2 is very small and must be machined with high dimensional precision and within very strict tolerance limits.

(2) The surface to be machined consists of a hard, brittle material like ferrite.

(3) The finished surface must be of high quality.

This type of machining work is generally carried out by grinding or lapping. Because of the brittle nature of the material that has to be machined, however, even the slightest vibration of the grinder etc. used for the operation is liable to cause chipping of the machined surface and it is thus necessary to assure high precision rotation of the grinding tool and to feed the work with utmost smoothness free from the influence of any irregularities on the guide surfaces.

In the ordinary XY table there are used sliding or rolling guide surfaces. The first of these is susceptible to sticking and slipping during low-velocity feeding while the latter tends to give rise to minute table vibration during travel of the rollers. Moreover, the nut which engages with the lead screw in the conventional XY table has either an acme or bore screw thread. These are also disadvantageous since the acme screw thread has a friction problem and the bore screw thread has poor damping capacity and a tendency to generate minute vibration. As a result, with the XY tables used up to now chipping of the material being machined and other defects have been common.

SUMMARY OF THE INVENTION

The primary object of the present invention is to provide a hydrostatic pressure XY table which is optimally suited for use in the high-precision, high-quality machining of a brittle material.

Another object of the invention is to provide such a hydrostatic pressure XY table which is capable of precision positioning to within 0.1 micron.

Still another object of the invention is to provide such a hydrostatic pressure XY table having rigidity and damping capacity adequate for withstanding machining load.

Still another object of the invention is to provide such a hydrostatic pressure XY table which is able to carry out smooth and steady feed even at extremely low velocities.

In accordance with the present invention there is provided a hydrostatic pressure XY table comprising a bed having a first trapezoidal groove; a first sliding table engaged with the first trapezoidal groove and having a second trapezoidal groove running perpendicular to the first trapezoidal groove; a second sliding table engaged with the second trapezoidal groove; four hydrostatic pressure guides provided in the bed, one on either inclined lateral wall of the first trapezoidal groove and one on either side of the first trapezoidal groove on the upper surface of the bed, to engage with engaging surfaces of the first sliding table; four hydrostatic pressure guides provided in the first sliding table, one on either inclined lateral wall of the second trapezoidal groove and one on either side of the second trapezoidal groove on the upper surface of the first sliding table, to engage with engaging surfaces of the second sliding table; a plurality of fluid pressure lines for supplying hydrostatic pressure from an external hydrostatic fluid pressure source to the engaging surfaces of the first and second sliding tables; a first hydrostatic pressure feed mechanism for the first sliding table consisting of a first lead screw and a first nut engaged therewith, the first nut having a fluid pressure line for supplying hydrostatic pressure to opposite screw faces of the first lead screw; and a second hydrostatic pressure feed mechanism for the second sliding table oriented perpendicular to the first hydrostatic pressure feed mechanism consisting of a second lead screw and a second nut engaged therewith, the second nut having a fluid pressure line for supplying hydrostatic pressure to opposite screw faces of the second lead screw.

BRIEF DESCRIPTION OF THE DRAWINGS

The invention will now be described with reference to an embodiment thereof shown in the attached drawings wherein.

DESCRIPTION OF THE PREFERRED EMBODIMENT

Referring to the drawings, a first sliding table 20 is mounted on a base 10 having a first trapezoidal groove in such manner as to be guided by the inclined lateral surfaces 10a, 10b of the first trapezoidal groove and by the upper surfaces 10c, 10d of the base 10 located one on either side of the first trapezoidal groove. That is to say, the first sliding table 20 is guided by four surfaces of the base 10. At each engagement region between the bed 10 and the first sliding table 20 is provided one or more rows of hydrostatic pressure pockets 20a, 20b, 20c and 20d. A fluid delivered under pressure from an external hydrostatic fluid pressure source (not shown) passes through a fluid pressure line (not shown) in the bed 10, a pantograph fluid pressure line 11 adapted to expand and contract with the travel of the first sliding table 20 and a fluid pressure line 20e in the table to be supplied to the hydrostatic pressure pockets 20a, 20b, 20c and 20d. As a result, a hydrostatic bearing force is generated at each of the surfaces 10a, 10b, 10c and 10d.

Figure 3:
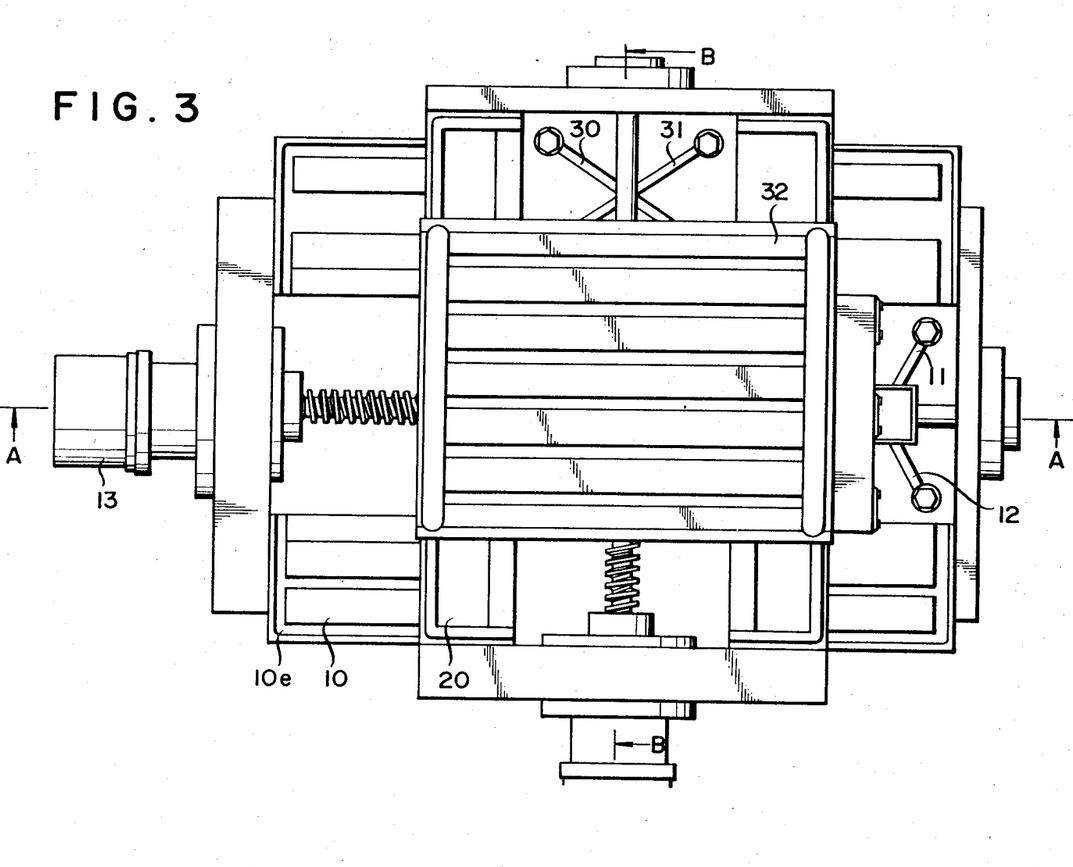
FIG. 3 is a plan view of the hydrostatic pressure XY table.
Figure 4:
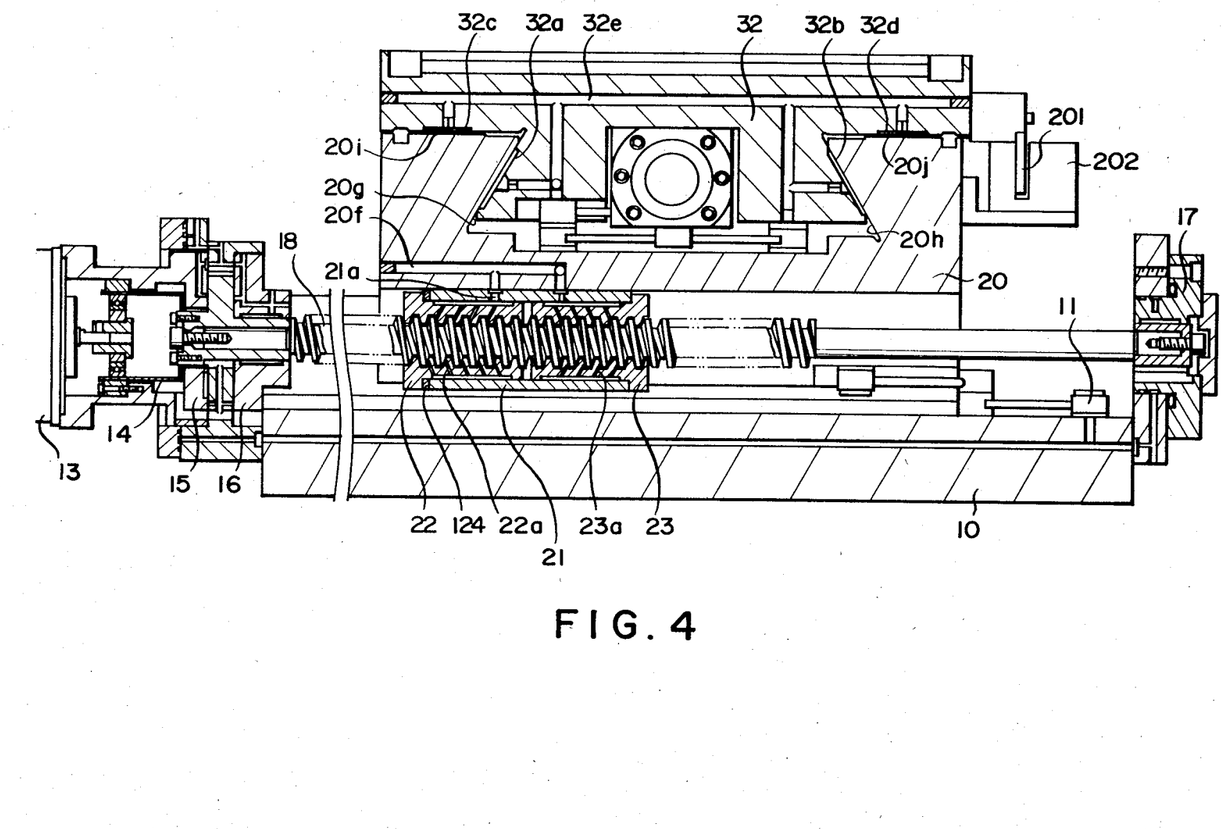
FIG. 4 is a cross-sectional view taken along line A—A in FIG. 3.

On the other hand, a first lead screw 18 is supported by hydrostatic bearing 15, 16 and 17 provided in the bed 10 and is rotatingly driven by a motor 13 through a speed reducer 14. Static pressure is supplied to the opposite screw faces of the first lead screw 18 via a fluid pressure line in the bed 10, a pantograph fluid pressure line 12, a fluid pressure line 20f in the first sliding table 20 and a fluid pressure line 21a in a first nut housing 21. The nut housing 21 is provided with female screws 22, 23 having fluid pressure lines 22a, 23a, respectively. The female screws 22, 23 engage with the first lead screw 18. Moreover, a pair of hydrostatic pressure nuts are inserted and fixed within the first nut housing 21 as opposed to each other. Since the screw surfaces are supported by hydrostatic pressure through this hydrostatic pressure feed mechanism, the rigidity and damping capacity in the feed direction is improved and, further, it is made possible to transfer smooth feeding motion to the first sliding table 20 without friction or backlash.

The spacer 124 shown in the drawings is for adjusting the lead face gap between the lead screw 18 and the female screws 22, 23. Fluid exhausted from the aforesaid engagement regions passes through exhaust passages 10e etc. to be once recovered in the first trapezoidal groove in the bed 10 and is then exhausted to the exterior of the bed 10.

The reliability of the first sliding table is further enhanced by a completely closed loop servo-mechanism wherein a signal detected from an optical scale 101 is detected by a detector 102 and then after being electrically processed is fed back to the motor 13.

Figure 5:
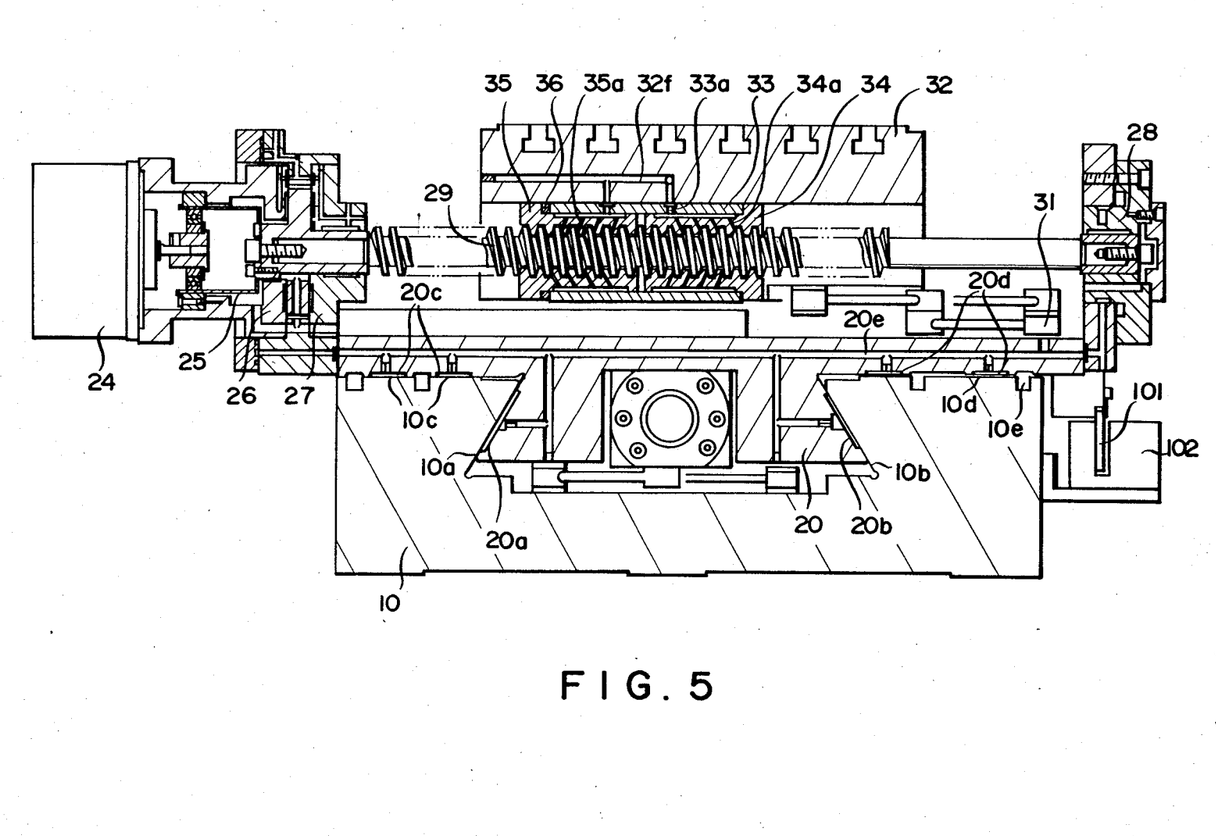
FIG. 5 is a cross-sectional view taken along line B—B in FIG. 3.

In a similar manner, a second lead screw 29 is rotatingly driven via a speed reducer 25 by a second motor 24 fixed on the first sliding table 20. The second lead screw 29 is supported on the first sliding table 20 by hydrostatic bearings 26, 27 and 28. Static pressure is supplied to the opposite screw faces of the second lead screw 29 via the pantograph fluid pressure line 12, a pantograph fluid pressure line 30, a fluid pressure line 32f in the second sliding table 32, a fluid pressure line 33a in a second nut housing 33, and fluid pressure lines 34a, 35a. A pair of female screws 34, 35 are inserted and fixed within the second nut housing 33 as opposed to each other. A spacer 36 is provided between the female screw 35 and the second nut housing 33. Thus the screw surfaces are also supported by hydrostatic pressure by the second hydrostatic pressure nut.

The first sliding table 20 is also provided with a trapezoidal groove and the second sliding table 32 is mounted on the first sliding table 20 in such manner as to be guided by the inclined lateral surfaces 20g, 20h of this second trapezoidal groove and by the upper surfaces 20i, 20j of the first sliding table 32 located one on either side of the second trapezoidal groove. That is to say, the second sliding table 32 is guided by four surfaces of the first sliding table 20. At each engagement region between the first sliding table 20 and the second sliding table 32 is provided one or more rows of hydrostatic pressure pockets 32a, 32b, 32c and 32d. A fluid delivered under pressure passes through the pantograph fluid pressure line 11, a pantograph pressure fluid line 31 and a fluid pressure line 32e in the second sliding table 32 to be supplied to the hydrostatic pressure pockets 32a, 32b, 32c and 32d. As a result a hydrostatic bearing force is generated at each of the surfaces 20g, 20h, 20i and 20j.

Moreover, the second sliding table 32 is also provided with a completely closed loop servo-mechanism wherein there is provided an optical scale 201 and the output signal of a detector 202 is fed back to the motor 24. Thus, the second sliding table 32 can be fed with the same high precision and high rigidity as the first sliding table 20.

When the hydrostatic pressure XY table according to this invention is applied to a machine tool it becomes possible to realize a dramatic improvement in dimensional and positional accuracy as well as in the quality of the machined surface in such operations as the grinding of magnetic disk heads where a dimensional tolerance of ±1 micron must be observed in the respective processing steps, the grinding and polishing of plastic shaping dies where very strict precision requirements must be observed regarding shaping accuracy and surface roughness, and the machining of precision index plates and optical communication connectors where extremely high pitch precision is required.

As shown in FIG. 3 the hydrostatic pressure XY table according to the embodiment shown in the drawings comprises four pantograph fluid pressure lines as expandable and contractable means for supplying hydrostatic pressure. These four pantograph fluid pressure lines being all of the same structure, the description here will be limited to the one denoted by reference numeral 11 and shown in overall plan view in FIG. 6(A) and in a vertical cross-sectional view of its essential portion in FIG. 6(B).

Figure 6:
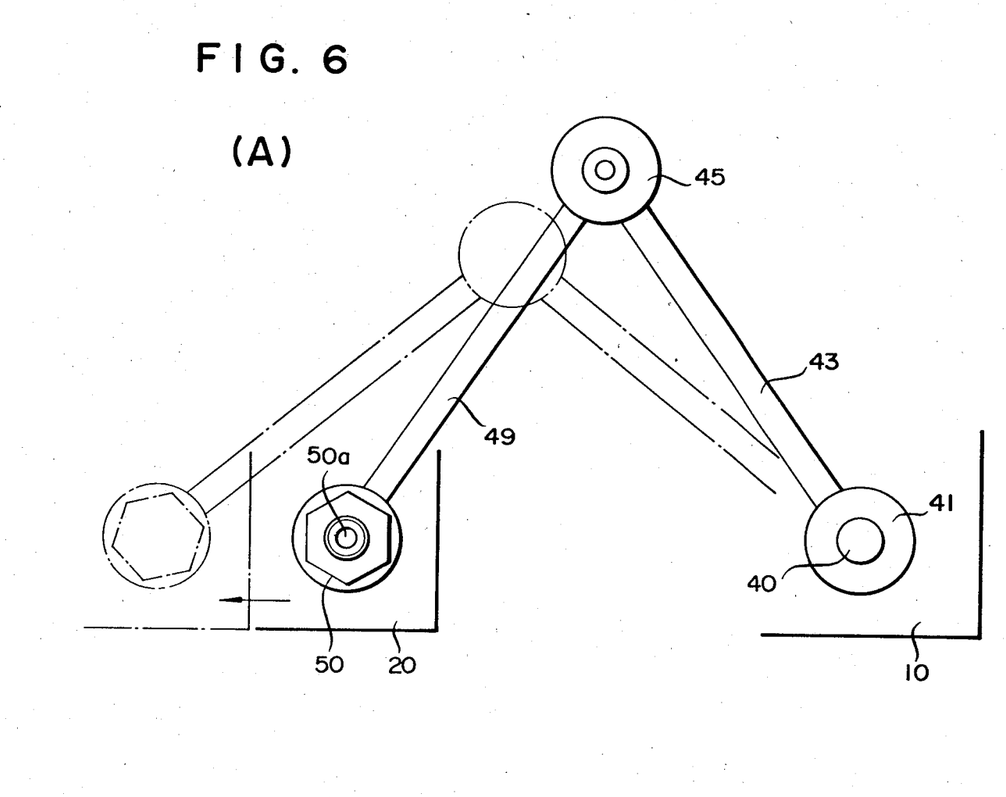
FIGS. 6(A) and 6(B) are a plan view and a cross-sectional view of a specific structure for a fluid pressure line according to this invention, FIG. 6(B) showing only the essential portions thereof.

Fluid delivered under pressure from an external fluid pressure source (not shown) passes through a fluid pressure line in the bed 10 and enters an inlet passage 40a formed in a pillar member 40. To facilitate its attachment to the bed 10, the pillar member 40 is provided with a screw portion 40b and a hexagonal nut portion 40c and by means of these portions is tightly screwed into threaded hole provided in the bed 10 so as to preclude any leakage of the fluid.

A ring 41 having a pipe 43 fixed thereto by welding or the like is fitted over one portion of the pillar member 40 so as to be free to rotate thereabout. A seal member 42 is provided so as to prevent leakage of the fluid as when the ring 41 rotates on the pillar member 40.

On the table 20 is provided a pillar member 50 and related members which are so similar in construction to those described above that no detailed explanation will be given here. The ends of the pipes 43 and 49 opposite those fixed to the rings 41, 51 respectively have attached thereto by welding or the like rings 45, 46. The rings 45, 46 are fitted over a shaft 44 formed with a fluid pressure passage 44a so as to be free to rotate thereabout. Seals 47, 48 are provided so as to constitute a leak proof coupling member for the passage of fluid.

As the pantograph fluid pressure line constructed as described above makes it possible to effectively utilize the space existing between the bed 10 and the first sliding table 20, for example, it can be used, as in the hydrostatic XY table of this embodiment, to provide a highly compact unit.

The structure described in the foregoing is also very advantageous from a practical viewpoint in that the fluid pressure lines do not strike against or hinder the movement of other members and do not obstruct the movement of the sliding tables so that it is possible to prevent any damage to the hydrostatic pressure guide surfaces which might occur should any of the fluid lines be damaged.

When expandable and contractable fluid pressure lines of the foregoing type are incorporated into the hydrostatic pressure XY table described above and the combination is applied to a machine tool it becomes possible to stably carry out feed of the sliding tables at a positioning precision of within 0.1 micron and to carry out smooth and steady feed even at extremely low velocities. As a result, it is possible to realize a dramatic improvement in dimensional and positional accuracy as well as in the quality of the machined surface in such operations as the grinding of magnetic disk heads where a dimensional tolerance of ±1 micron must be observed in the respective processing steps, the grinding and polishing of semiconductor wafers where very strict precision requirements must be observed regarding dimensional accuracy and surface roughness, the grinding and polishing of shaping dies for plastic optical components, and the machining of precision index plates and optical communication connectors where extremely high pitch precision is required.

The pantograph fluid pressure lines used in this invention are not limited to the particular structure described with respect to the foregoing embodiment, and any type of pantograph fluid pressure lines may be used insofar as they are able to expand and contract in response to the movement of the sliding tables and provide the same function as the type described above.

Also, although the pantograph fluid pressure line mentioned above has been described with reference to a hydrostatic pressure XY table, it is by no means limited to such an application.

As will be clear from the foregoing description, when the hydrostatic pressure XY table according to this invention is applied to a machine tool it becomes possible to realize a dramatic improvement in dimensional and positional accuracy as well as in the quality of the machined surface in such operations as the grinding of magnetic disk heads where a dimensional tolerance of ±1 micron must be observed in the respective processing steps, the grinding and polishing of plastic shaping dies where very strict precision requirements must be observed regarding shaping accuracy and surface roughness, and the machining of precision index plates and optical communication connectors where extremely high pitch precision is required.

We claim:

1. In an XY table comprising a bed, a first lead screw supported on the bed by bearings, a first motor provided on the bed for rotatingly driving the first lead screw, a first sliding table mounted on the bed for sliding motion in the X direction, the first sliding table having a first nut for engagement with the first lead screw, a second lead screw supported on the first sliding table by bearings, a second motor provided on the first sliding table for rotatingly driving the second lead screw, and a second sliding table mounted on the first sliding table for sliding motion in the Y direction, the second sliding table having a second nut for engagement with the second lead screw, the improved hydrostatic pressure XY table characterized in that the bed has a first trapezoidal groove; the first sliding table is engaged with the first trapezoidal groove and has a second trapezoidal groove running perpendicular to the first trapezoidal groove; the second sliding table is engaged with the second trapezoidal groove; four hydrostatic pressure guides are provided in the bed, one on either inclinded lateral wall of the first trapezoidal groove and one on either side of the first trapezoidal groove on the upper surface of the bed, to engage with engaging surfaces of the first sliding table; four hydrostatic pressure guides are provided in the first sliding table, one on either inclined lateral wall of the second trapezoidal groove and one on either side of the second trapezoidal groove on the upper surface of the first sliding table, to engage with engaging surfaces of the second sliding table; a plurality of fluid pressure lines are provided for supplying hydrostatic pressure from an external hydrostatic fluid pressure source to the engaging surfaces of the first and second sliding tables, each of the fluid pressure lines for supplying hydrostatic fluid pressure from an external hydrostatic fluid pressure source to engaging surfaces of the first and second sliding tables comprises a pantograph fluid pressure line consisting of a first rotatable member on whichever of the base and the first sliding table constitutes the stationary side and connected with the external hydrostatic fluid pressure source, a second rotatable member fixed on whichever of the first sliding table and the second sliding table constitute the moving side, and a rotatable coupling provided with a fluid passage for connecting the first member with the second member, the pantographic fluid pressure line being disposed within the area of the bed as viewed from the top and within the space between the bed and first sliding table or between the first sliding table and the second sliding table; a first hydrostatic pressure feed mechanism consisting of the first lead screw, the first nut and a fluid pressure line for supplying hydrostatic pressure through the first nut to opposite screw faces of the first lead screw is provided for the first sliding table; and a second hydrostatic pressure feed mechanism consisting of the second lead screw, the second nut and a fluid pressure line for supplying hydrostatic pressure through the second nut to opposite screw faces of the second lead screw is provided for the second sliding table.

2. A hydrostatic pressure XY table according to claim 1, wherein the engaging surfaces of the first sliding table opposed to the inclined lateral walls of the first trapezoidal groove and to the upper surfaces of the bed on both sides of the first trapezoidal groove and the engaging surfaces of the second sliding table opposed to the inclined lateral walls of the second trapezoidal groove and to the upper surfaces of the first sliding table on both sides of the second trapezoidal groove are each provided with one or more rows of hydrostatic presure pockets.

3. A hydrostatic pressure XY table according to claim 1, wherein each of the first and second nuts comprises a nut housing and two female screws inserted and fixed within the nut housing to oppose each other, the nut housing and the female screws being provided with fluid pressure lines through which hydrostatic pressure is supplied to one screw face of the associated lead screw through one female screw and to the other screw face thereof through the other female screw.

4. A hydrostatic pressure XY table according to claim 3, wherein a spacer is provided between at least one of the female screws and the nut housing for adjusting the lead face gap between the female screw and the lead screw.

5. A hydrostatic pressure XY table according to claim 1, wherein each of the first and second lead screws is provided with a completely closed loop servomechanism comprising an optical scale and a detector for detecting a signal from the optical scale, the signal being fed back to the associated motor after being electrically processed.

* * * * *